United States Patent
Mihailovich et al.

(10) Patent No.: US 10,613,319 B2
(45) Date of Patent: Apr. 7, 2020

(54) COMPACT, HIGH-PERFORMANCE MEMS-BASED OPTICAL SHUTTER

(71) Applicant: Teledyne Scientific & Imaging, LLC, Thousand Oaks, CA (US)

(72) Inventors: Robert Mihailovich, Newbury Park, CA (US); Alex Papavasiliou, Thousand Oaks, CA (US); Philip Stupar, Oxnard, CA (US); Jeffrey DeNatale, Thousand Oaks, CA (US); Maximillian A. Perez, Boulder, CO (US)

(73) Assignees: Teledyne Scientific & Imaging, LLC, Thousand Oaks, CA (US); Coldquanta, Inc., Boulder, CO (US)

( * ) Notice: Subject to any disclaimer, the term of this patent is extended or adjusted under 35 U.S.C. 154(b) by 179 days.

(21) Appl. No.: 16/005,369

(22) Filed: Jun. 11, 2018

(65) Prior Publication Data

US 2019/0377174 A1    Dec. 12, 2019

(51) Int. Cl.
    *G02B 26/02*    (2006.01)
    *G02B 27/30*    (2006.01)
    *G02B 7/04*     (2006.01)

(52) U.S. Cl.
    CPC ............ *G02B 26/02* (2013.01); *G02B 7/04* (2013.01); *G02B 27/30* (2013.01)

(58) Field of Classification Search
    CPC .......... G02B 26/02; G02B 27/30; G02B 7/04; G02B 26/08; G02B 26/0833; G02B 26/0858
    USPC ........................................................ 359/230
    See application file for complete search history.

(56) References Cited

U.S. PATENT DOCUMENTS

2018/0267324 A1*   9/2018   Hong ................. G02B 27/0955

* cited by examiner

*Primary Examiner* — William R Alexander
*Assistant Examiner* — Henry A Duong
(74) *Attorney, Agent, or Firm* — M.J. Ram & Associates

(57) ABSTRACT

A micro-machined optical shutter includes an entry layer with a through-passage having an input side adapted to receive incoming light and an output side, and an exit layer with a through-passage having an input side comprising a pinhole and an output side. The entry and exit layers are vertically aligned, thereby providing an optical path such that light exiting the entry layer enters the exit layer via the pinhole unless the optical path is interrupted. An actuation plane positioned between the entry and exit layers comprises a shutter blade and an actuator arranged to move the shutter blade laterally with respect to the pinhole when actuated. The shutter blade preferably has a reflective angled surface such that, when the blade covers the pinhole, the angled surface redirects light on the optical path away from the pinhole, preferably into a micromachined beam dump.

37 Claims, 5 Drawing Sheets

FIG. 4
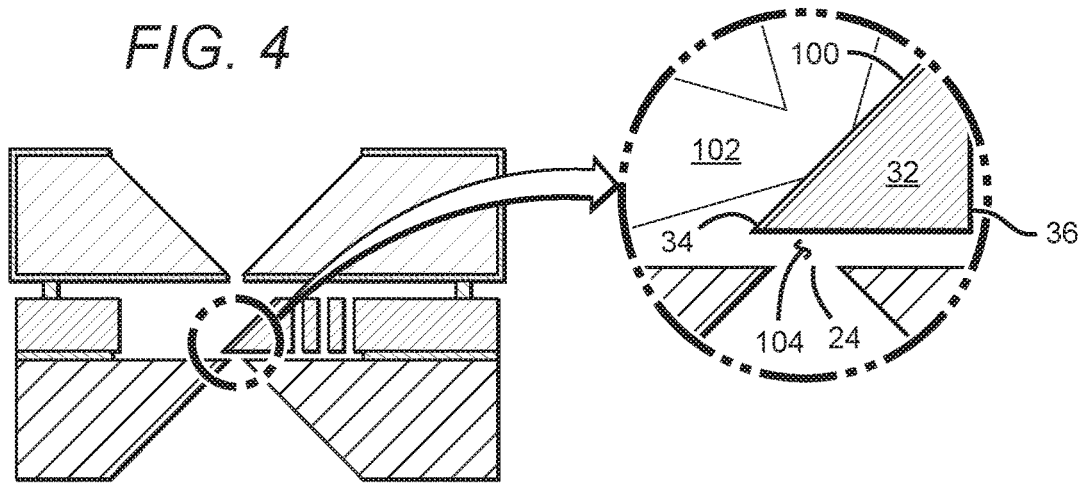
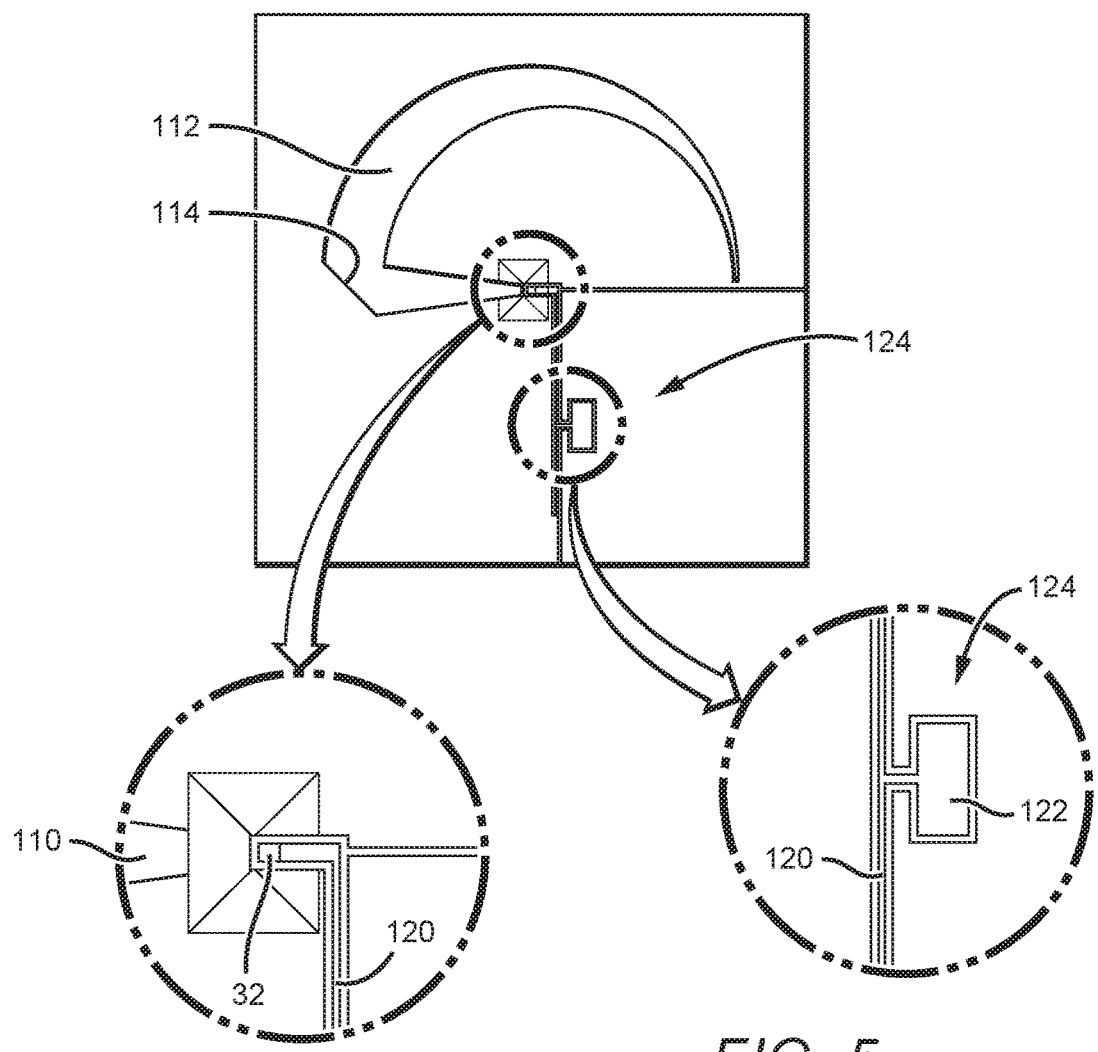
FIG. 5

COMPACT, HIGH-PERFORMANCE MEMS-BASED OPTICAL SHUTTER

BACKGROUND OF THE INVENTION

Field of the Invention

This invention relates generally to optical shutters, and more particularly to micro-machined optical shutters.

Description of the Related Art

An optical shutter comprises an actuator which is electrically controlled to permit or block the passage of light. For example, various high-performance devices can be realized using quantum phenomena occurring in cold atom and cold ion systems, which employ laser cooling. However, this requires the availability of a compact optical shuttering component which can provide rapid switching of laser light. Ideally, the shuttering component would provide low ON-state optical loss, high OFF-state optical extinction, and rapid transient-free transitions between ON and OFF states, all within a compact/lower-power format.

Optical shuttering is presently achieved with various technologies. For example, a basic electro-mechanical shutter can provide good ON- and OFF-state optical performance, but at the expense of switching speed, size, and power. Electro-optical shutters offer fast switching with small size and low power, but typically at the expense of poor optical performance. Another option is to provide two different device technologies in series: for example, a mechanical component to provide OFF isolation and an electro-optical component to provide fast switching. However, such an approach is likely to be large, complex, expensive, and power hungry.

SUMMARY OF THE INVENTION

An optical shutter is presented capable of providing high performance in a compact form factor, with an actuator design that enables high-speed/transient-free switching at low power.

The present optical shutter may be fabricated into a mm-sized chip device, preferably via micromachining silicon-on-insulator (SOI) or double-SOI substrates. The shutter comprises an entry layer comprising a through-passage having an input side adapted to receive incoming light and an output side, and an exit layer comprising a through-passage having an input side comprising a pinhole and an output side. The entry and exit layers are vertically aligned, thereby providing an optical path such that at least some of the light exiting the output side of the entry layer enters the input side of the exit layer via the pinhole, unless the optical path is interrupted. An actuation plane is positioned between the entry and exit layers, which comprises a shutter blade having a leading end and a trailing end, and an actuator arranged to move the shutter blade laterally with respect to the pinhole when actuated.

The actuation plane can be arranged such that when the shutter blade is actuated, the leading end of the shutter blade covers the pinhole and interrupts the optical path, and when un-actuated, the leading end of the shutter blade does not cover the pinhole. Alternatively, the actuation plane can be arranged such that when the shutter blade is actuated, the leading end of the shutter blade uncovers the pinhole, and when un-actuated the leading end of the shutter blade covers the pinhole and interrupts the optical path.

A preferred embodiment of the shutter blade has a reflective angled surface such that, when the blade's leading end covers the pinhole, the angled surface redirects light on the optical path away from the pinhole. The shutter preferably includes a micromachined beam dump positioned to receive light that has been redirected by the shutter blade.

The present optical shutter preferably also includes an input microlens which focuses incoming light, and an output microlens which collimates light which has passed through the pinhole.

These and other features, aspects, and advantages of the present invention will become better understood with reference to the following drawings, description, and claims.

BRIEF DESCRIPTION OF THE DRAWINGS

FIG. 4 is a magnified sectional view illustrating the reflection of light off of a surface of a shutter blade.

FIG. 5 is a magnified plan view illustrating one possible embodiment of a beam dump.

DETAILED DESCRIPTION OF THE INVENTION

Figure 1:
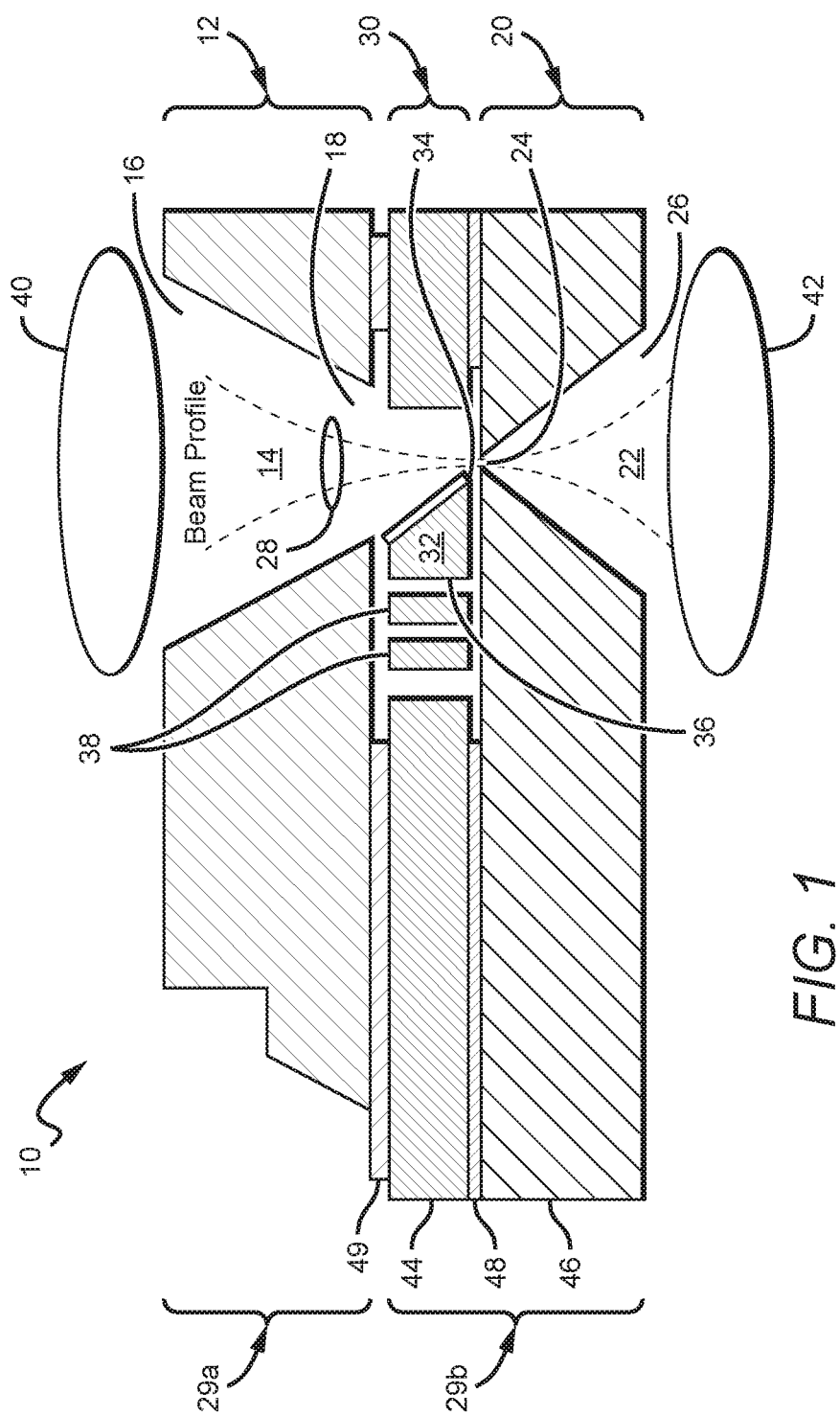
FIG. 1 is a sectional view of one possible embodiment of an optical shutter per the present invention.

A micro-machined (used herein as synonymous with "MEMS-based") optical shutter in accordance with the present invention is illustrated with the sectional view shown in FIG. 1. The shutter 10 includes an "entry layer" 12 comprising a through-passage 14, with an input side 16 adapted to receive incoming light and an output side 18. The shutter also includes an "exit layer" 20 comprising a through-passage 22, with an input side comprising a pinhole 24 and an output side 26.

The entry and exit layers 12, 20 are vertically aligned, thereby providing an optical path 28 such that at least some of the light exiting the output side 18 of entry layer 12 enters the input side of exit layer 20 via pinhole 24—unless optical path 28 is interrupted. The entry and exit layers are preferably micro-machined in substrates 29a and 29b, respectively; optical path 28 is preferably normal to the plane of the substrates.

The present optical shutter also requires an actuation plane 30, positioned between entry layer 12 and exit layer 20. Actuation plane 30 comprises a shutter blade 32 having a leading end 34 and a trailing end 36, and an actuator 38 arranged to move the shutter blade laterally with respect to pinhole 24 when actuated. When shutter blade 32 is over pinhole 24, optical path 28 is interrupted such that substantially none of the incoming light received at the input side 16 of the entry layer reaches exit layer 20. By controlling the position of shutter blade 32 such that it either covers or does not cover pinhole 24, optical shutter functionality is provided.

Actuation plane 30 can be arranged such that, when shutter blade 32 is actuated, the leading end 34 of shutter blade covers pinhole 24, and when un-actuated, the leading end of the shutter blade does not cover the pinhole. Alternatively, actuation plane 30 can be arranged such that, when shutter blade 32 is actuated, the leading end 34 of the shutter blade uncovers pinhole 24, and when un-actuated the leading end of the shutter blade covers the pinhole.

As shown in FIG. 1, it is preferred, though not essential, that entry layer 12 have angled walls, such that input side 16 is wider than output side 18, and exit layer 20 has angled walls such that its input side 24 is narrower than its output side 26. Angled walls improve the likelihood that a light beam will pass through the shutter without clipping. The edges of a typical light beam edge are illustrated in FIG. 1 by the dashed "Beam Profile" lines.

The present optical shutter may include optical devices on one or both sides of the shutter. For example, in FIG. 1, an input microlens 40 might be provided to focus incoming light, and an output microlens 42 might be provided to collimate light which has passed through pinhole 24.

As noted above, the entry and exit layers 12, 20 are preferably micro-machined in respective substrates 29a and 29b. In the exemplary embodiment shown in FIG. 1, first substrate 29a is a basic silicon (Si) substrate, and second substrate 29b is a silicon-on-insulator (SOI) substrate having a top Si layer 44 and a bottom insulator layer 46, separated by an insulator layer 48 (note that insulator layers between Si layers in SOI and double-SOI substrates are also referred to as "buried oxide" layers). An adhesive layer 49 is between substrates 29a and 29b, and serves to bond the substrates together; the layer is suitably metal and achieves bonding using a thermocompression process. Here, shutter blade 32 and actuator 38 are micromachined in top Si layer 44, and pinhole 24 is formed through insulator layer 48 and bottom Si layer 46. In the illustrated embodiment, in which the entry and exit layers 12, 20 have single-profile sidewalls, pinhole 24 is preferably at the apex of exit layer 20.

The shape of the pinhole is preferably circular, though other shapes could also be used. The entry and exit layer sidewalls are preferably etched with tetramethylammonium hydroxide (TMAH) or a TMAH-based etchant. Other etchants might also be used; one suitable alternative is a potassium hydroxide (KOH) etchant.

Figure 2:
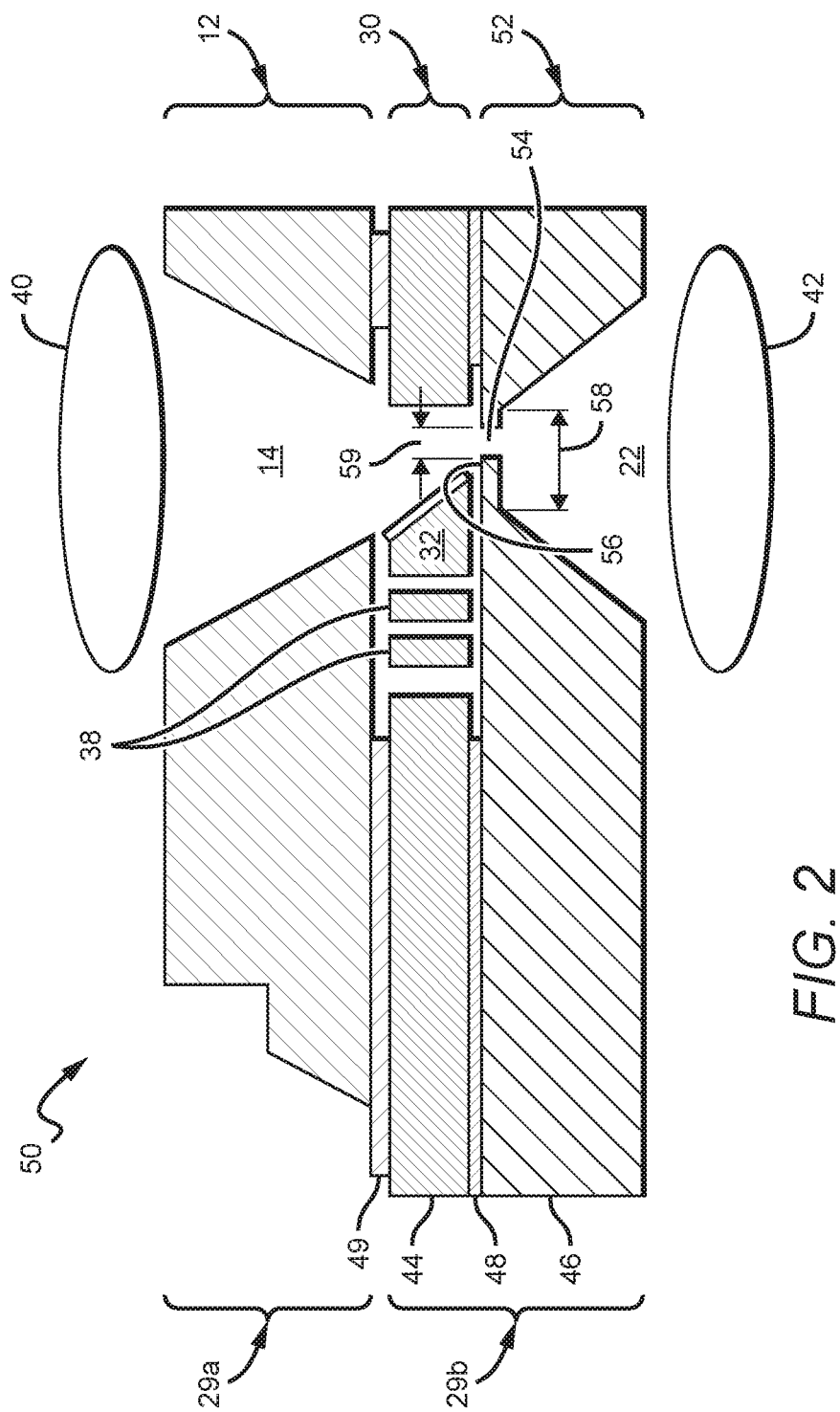
FIG. 2 is a sectional view of another possible embodiment of an optical shutter per the present invention.

Another possible embodiment of the present optical shutter is illustrated in the sectional view shown in FIG. 2. As in FIG. 1, the shutter 50 is micro-machined in respective substrates 29a and 29b, with substrate 29b being an SOI substrate. The shutter includes an entry layer 12 and actuation plane 30 as in FIG. 1. Here, however, an exit layer 52 has a pinhole 54 which comprises a vertical-walled hole in the exit layer, through a planar layer 56 which otherwise spans the input side of the exit layer's through-passage 22. This configuration of pinhole 54 is likely to be easier to fabricate that the 'apex' pinhole 24 shown in FIG. 1, which would typically be defined with a long wet etch from the backside, with precise timing required for etch stopping. In contrast, the vertical-walled pinhole 54 of FIG. 2 would typically be defined by a vertical-walled topside etch, with the angled walls of exit layer 52 defined with an angle-walled bottomside etch. It is preferred that the ratio of the lateral width 58 of planar layer 56 to the width 60 of vertical-walled hole 54 be at least 2:1.

Figure 3:
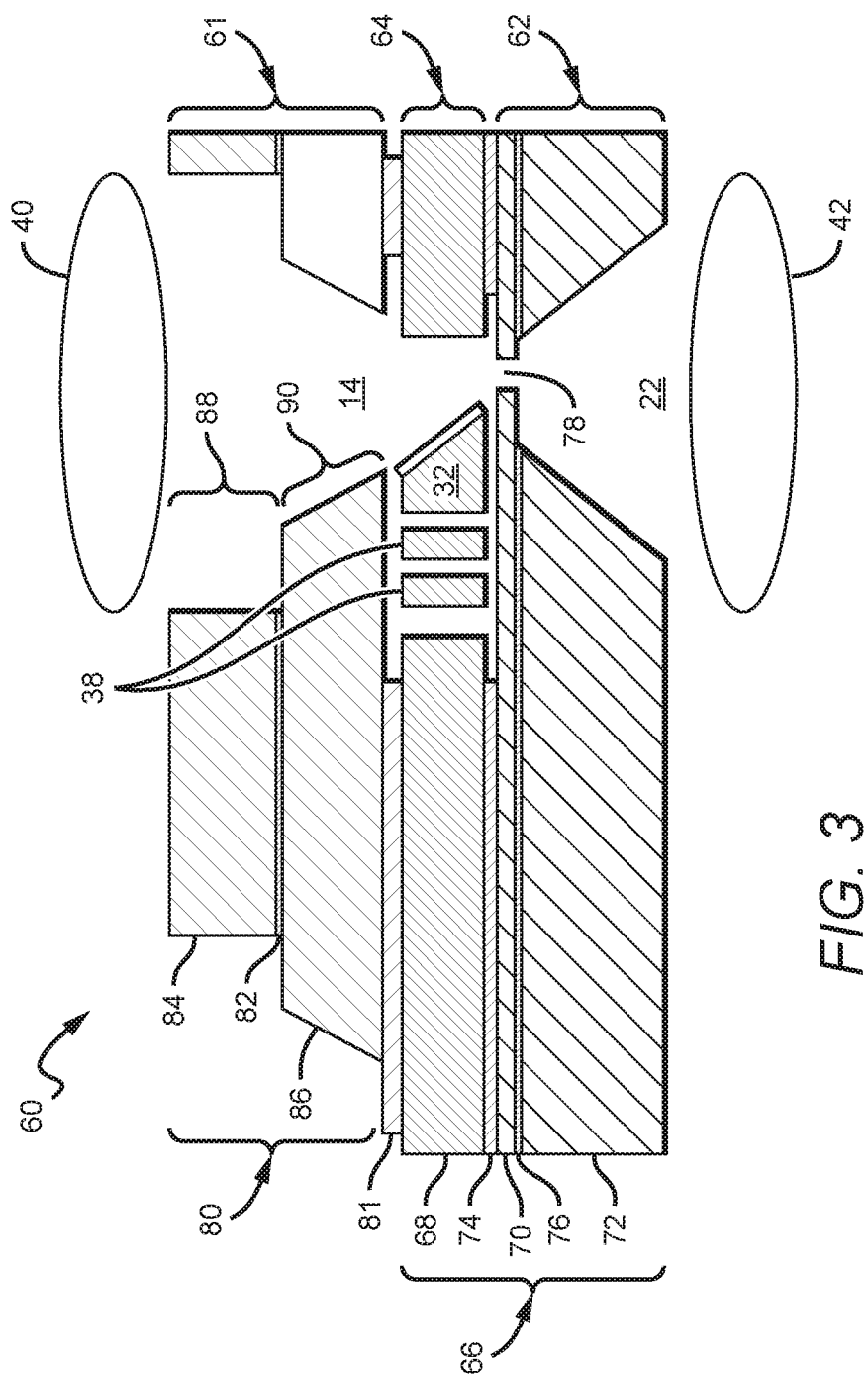
FIG. 3 is a sectional view of another possible embodiment of an optical shutter per the present invention.

Another possible embodiment of the present optical shutter is illustrated in the sectional view shown in FIG. 3. Shutter 60 includes an entry layer 61, an exit layer 62, and an actuation plane 64. Exit layer 62 and actuation plane 64 are formed in a double-SOI (DSOI) substrate 66. Substrate 66 has top (68), middle (70), and bottom (72) Si layers, with the top and middle Si layers separated by a first insulator layer 74 and the middle and bottom Si layers separated by a second insulator layer 76. Shutter blade 32 and actuator 38 are micromachined in top Si layer 68, and pinhole 78 is formed through first insulator layer 74 and middle Si layer 70.

One advantage to using a DSOI substrate for the exit and actuation layers is that the substrate facilitates the formation of the pinhole 78. Buried oxide layer 76 can serve as an etch stop for exit layer 62, and buried oxide layer 74 can serve as an etch stop for pinhole 78. As with the embodiment described above in relation to FIG. 2, pinhole 78 preferably comprises a vertical-walled hole, which in this case is in middle Si layer 70. It is also preferred that the width of the input side of through-passage 22 through bottom Si layer 72 be greater than the width of pinhole 78, with the ratio of the widths being at least 2:1.

FIG. 3 also illustrates the use of an SOI substrate 80 for entry layer 61, with a buried oxide layer 82 between a top Si layer 84 and a bottom Si layer 86; as before, an adhesive layer 81 bonds substrate 80 to substrate 66. This enables the formation of an entry layer with a complex profile. The example shown illustrates a dual-profile entry layer 61, comprising a vertical-wall section 88 and an angled-wall section 90, with buried oxide layer 82 serving as an etch stop layer. This capability might be useful to, for example, provide an opening shaped to facilitate the integration of microlens 40 with entry layer 61.

FIG. 4 provides a magnified sectional view of one possible embodiment of the shutter blade/pinhole area of the present optical shutter. Shutter blade 32 preferably has an angled surface 100 such that the thickness of the blade's leading end 34 is less than the thickness of its trailing end 36; a preferred angle is 45° with respect to chip normal orientation. The angled surface 100 is preferably reflective such that, when the leading end 34 of the shutter blade covers pinhole 24 (as in FIG. 4), the reflective angled surface redirects light 102 on optical path 28 away from pinhole 24. Note that there is preferably a gap 104 between pinhole 24 and shutter blade 32 when the shutter blade covers the pinhole, to facilitate the blade's lateral movement. A suitable size for the gap would be about 2 microns. A suitable width for the pinhole is about 4 microns.

The present optical shutter may also include a beam dump, preferably micromachined, positioned to receive and absorb light that has been redirected by shutter blade 32, and thereby prevent light from degrading the shutter's extinction ratio. This is illustrated in FIG. 5, which is a plan view of one possible embodiment of the beam dump. The beam dump 110 preferably comprises a wood's horn-shaped cavity 112 to minimize the area required, and a reflective angled surface 114 arranged to reflect light that has been redirected by shutter blade 32 into the cavity.

If microlenses are employed, the optical shutter may include at least one lens holder (not shown) arranged to hold a respective one of the microlenses. The lens holder would preferably have an adjustable focal length. Assuming that the optical shutter is fabricated as a microchip, the at least one lens holder is preferably affixed to the microchip using hydroxide-bonding, though other bonding processes might also be used.

As with the entry and exit layers and the beam dump, the optical shutter's shutter blade 32 and actuator 38 are preferably micro-machined. The actuator preferably comprises a micromachined flexure to which the shutter blade is affixed; the actuator is arranged such that the flexure deflects and the shutter blade moves laterally in response to an actuation voltage applied to the actuator. The flexure can be seen in FIG. 5, as feature 120.

Figure 6:
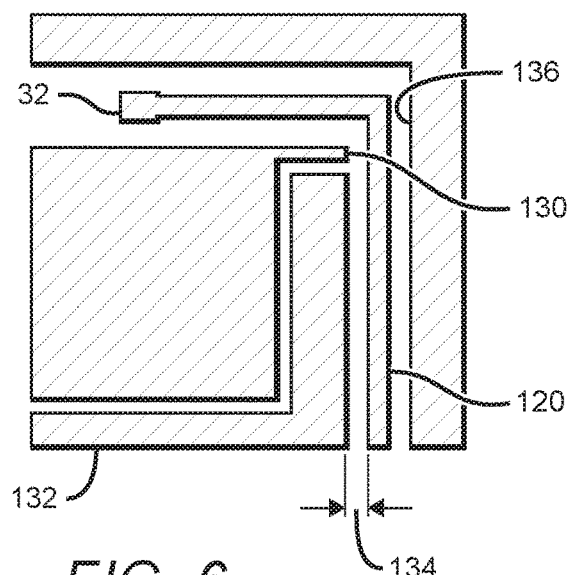
FIG. 6 is a magnified plan view illustrating one possible embodiment of a flexure and shutter blade.

A magnified plan view of one possible way in which actuator 38 could be configured is shown in FIG. 6. The actuator preferably includes a micromachined pullin stop 130 which limits the travel of flexure 120 when the actuator is actuated. The flexure is moved laterally when an actuation voltage is applied between the flexure and an electrode 132; pullin stop 130 serves to prevent contact—and thus electrical shorting—between flexure 120 and electrode 132 when the actuator is actuated. To minimize the mass on flexure 120, there is preferably no metal on the flexure; as such, the actuation voltage is preferably applied to the flexure via the silicon adjacent the flexure. The width of the gap between electrode 132 and flexure 120, referred to as the "actuation gap" 134, impacts the voltage required to pull the flexure to the pullin stop, referred to as the "pullin voltage". The position of pullin stop 130 with respect to flexure 120 dictates the maximum distance, or "throw", that the flexure can travel. A suitable throw is preferably about 8 microns for a pinhole width of about 4 microns, with the actuator arranged such that the leading edge of shutter blade 32 is 2 microns behind the pinhole when the pinhole is uncovered, and is 2 microns beyond the pinhole when the pinhole is covered. The location of the structure on the other side of flexure 120 (referred to as the "release stop" 136) with respect to the flexure impacts "ringing" for state transitions.

Figure 7:
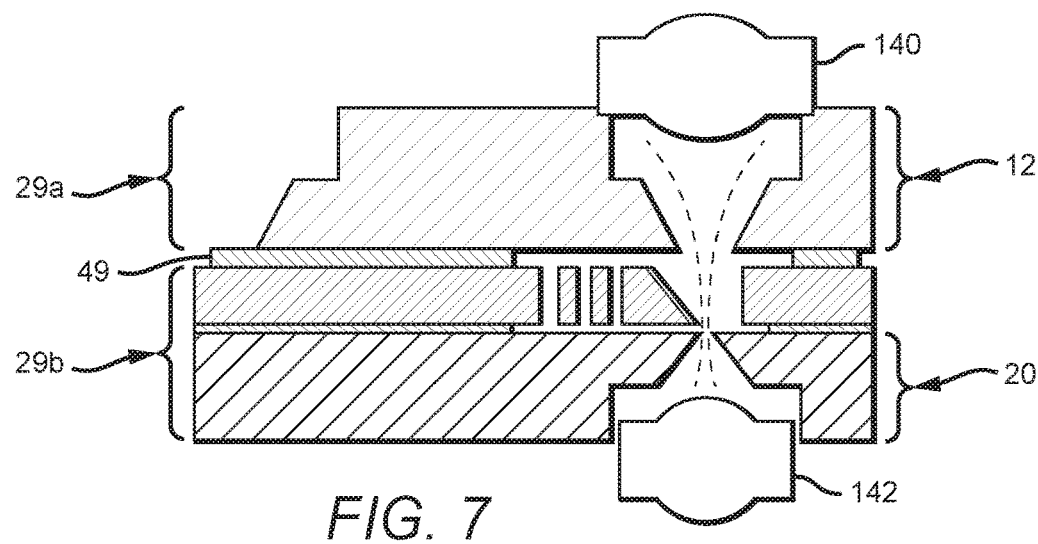
FIG. 7 is a sectional view of another possible embodiment of an optical shutter per the present invention.
Figure 8:
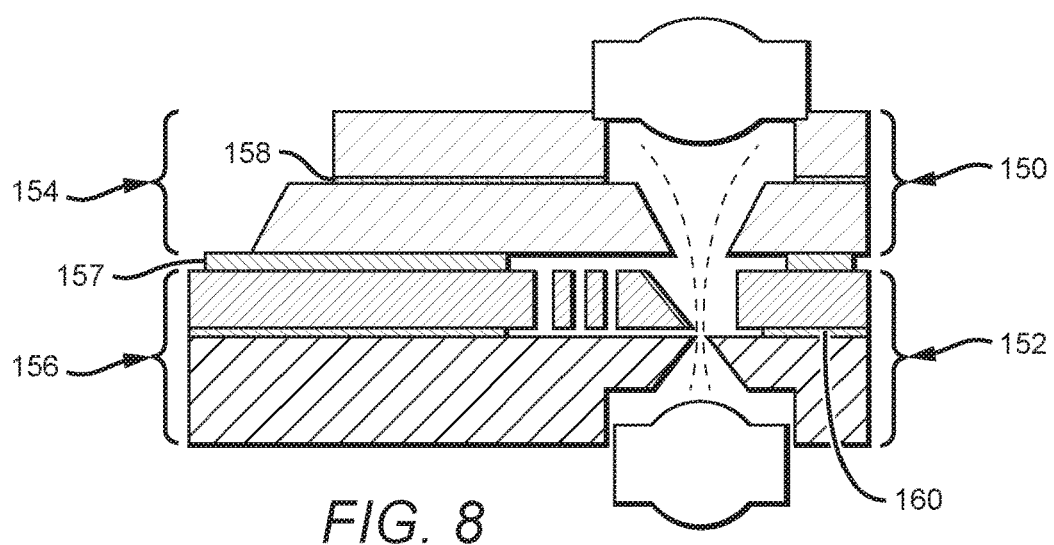
FIG. 8 is a sectional view of another possible embodiment of an optical shutter per the present invention.

As noted above, the present optical shutter may include one or more microlenses 40, 42. However, commercial off-the-shelf (COTS) microlenses, preferably made from molded glass with an anti-reflective coating, may have characteristics that make their integration with the shutter chip challenging, particularly for single-profile entry and exit layers. For example, a COTS microlens may be smaller than the surface opening of a single-profile entry/exit layer. It may also be the case that the focal distance of a COTS microlens is less than the thickness of the substrate in which it is to be used. Integration with such microlenses can be facilitated with the use of dual-profile entry and/or exit layers. This is illustrated in FIGS. 7 and 8. FIG. 7 is similar to FIG. 1, except that entry layer 12, micro-machined in Si substrate 29a, is now a dual-profile layer consisting of angled-wall and vertical wall sections. Similarly, exit layer 20, micro-machined in SOI substrate 29b, is also a dual-profile layer. The entry and exit layer profiles are designed to accommodate the size, shape, and focal length of their respective microlenses 140 and 142, which could be COTS microlenses.

In FIG. 8, both the entry layer 150 and exit layer 152 are micro-machined in respective SOI substrates 154 and 156, which are bonded together with an adhesive layer 157. This arrangement may make the optical shutter easier to fabricate, as the buried oxide layer 158 can facilitate the formation of the entry layer profile, with the layer's angled and vertical wall sections meeting at the buried oxide layer.

Thus, the optical shutter described herein enables the fabrication of a MEMS-based free-space shutter offering high performance in a compact form factor. The present shutter enables high-speed mechanical shuttering through microlens-based focusing, with an actuator design which enables high-speed/transient-free switching at low power, all incorporated into a mm-sized chip. An optical shutter in accordance with the present invention has myriad applications. One application for which the shutter is particularly well-suited is that of providing rapid switching of laser light used in cold atom and cold ion systems. Additional applications include clocks, inertial systems, and quantum computers.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:
1. A micro-machined optical shutter, comprising:
an entry layer comprising a through-passage having an input side adapted to receive incoming light and an output side;
an exit layer comprising a through-passage having an input side comprising a pinhole and an output side;
said entry and exit layers vertically aligned, thereby providing an optical path such that at least some of the light exiting the output side of said entry layer enters the input side of said exit layer via said pinhole unless said optical path is interrupted; and
an actuation plane positioned between said entry layer and said exit layer, comprising:
a shutter blade having a leading end and a trailing end; and
an actuator arranged to move said shutter blade laterally with respect to said pinhole when actuated.

2. The optical shutter of claim 1, wherein said entry layer has angled walls such that its input side is wider than its output side, and said exit layer has angled walls such that its input side is narrower than its output side.

3. The optical shutter of claim 1, further comprising an input microlens which focuses said incoming light, and an output microlens which collimates light which has passed through said pinhole.

4. The optical shutter of claim 3, further comprising at least one lens holder arranged to hold a respective one of said microlenses, said at least one lens holder having an adjustable focal length.

5. The optical shutter of claim 4, wherein said optical shutter comprises a microchip, said at least one lens holder hydroxide-bonded to said microchip.

6. The optical shutter of claim 1, wherein said entry and exit layers comprise first and second substrates, respectively, wherein said second substrate is a silicon-on-insulator (SOI) substrate having top and bottom silicon (Si) layers separated by an insulator layer, said shutter blade and actuator micro-machined in said top Si layer and said pinhole formed through said insulator layer and in said bottom Si layer.

7. The optical shutter of claim 6, further comprising an adhesive layer between said first and second substrates which bonds said substrates together.

8. The optical shutter of claim 7, wherein said adhesive layer is a metal layer.

9. The optical shutter of claim 6, wherein said pinhole is at the apex of said exit layer.

10. The optical shutter of claim 6, wherein said pinhole comprises a vertical-walled hole in said exit layer.

11. The optical shutter of claim 10, wherein said vertical-walled hole is through a planar layer which otherwise spans the input side of said exit layer's through-passage.

12. The optical shutter of claim 11, wherein the ratio of the lateral width of the portion of said planar layer which otherwise spans the input side of said exit layer's through-passage to the width of said vertical-walled hole is at least 2:1.

13. The optical shutter of claim 1, wherein said entry and exit layers comprise first and second substrates, respectively, wherein said first substrate is a silicon-on-insulator (SOI) substrate and said second substrate is a double-SOI (DSOI) substrate having top, middle, and bottom silicon (Si) layers with said top and middle Si layers separated by a first insulator layer and said middle and bottom Si layers separated by a second insulator layer, said shutter blade and actuator micromachined in said top Si layer and said pinhole formed through said first insulator layer and said middle Si layer.

14. The optical shutter of claim 13, further comprising an adhesive layer between said first and second substrates which bonds said substrates together.

15. The optical shutter of claim 14, wherein said adhesive layer is a metal layer.

16. The optical shutter of claim 13, wherein said pinhole comprises a vertical-walled hole in said middle Si layer.

17. The optical shutter of claim 16, wherein the input side of the through-passage through said bottom Si layer is wider than said pinhole.

18. The optical shutter of claim 17, wherein the ratio of the lateral width of the input side of the through-passage through said bottom Si layer to the width of said vertical-walled hole is at least 2:1.

19. The optical shutter of claim 1, further comprising an input microlens mounted in said entry layer which focuses said incoming light, and an output microlens mounted in said exit layer which collimates light which has passed through said pinhole, at least one of said entry and exit layers being a dual-profile layer shaped to facilitate the integration of its respective microlens with said layer.

20. The optical shutter of claim 19, wherein at least one of said dual-profile layers comprises an angled-wall section and a vertical-wall section.

21. The optical shutter of claim 19, wherein said entry and exit layers comprise first and second substrates, respectively, wherein at least one of said first and second substrates is a silicon-on-insulator (SOI) substrate having top and bottom silicon (Si) layers separated by an insulator layer, wherein each of said dual-profile apertures in an SOI substrate comprises an angled-wall section in one of said top and bottom Si layers and a vertical-wall section in the other of said top and bottom Si layers.

22. The optical shutter of claim 21, further comprising an adhesive layer between said first and second substrates which bonds said substrates together.

23. The optical shutter of claim 22, wherein said adhesive layer is a metal layer.

24. The optical shutter of claim 1, said actuation plane arranged such that, when said shutter blade is actuated, the leading end of said shutter blade covers said pinhole, and when un-actuated, the leading end of said shutter blade does not cover said pinhole.

25. The optical shutter of claim 1, said actuation plane arranged such that, when said shutter blade is actuated, the leading end of said shutter blade uncovers said pinhole, and when un-actuated the leading end of said shutter blade covers said pinhole.

26. The optical shutter of claim 1, further comprising a gap between said pinhole and said shutter blade when said shutter blade covers said pinhole.

27. The optical shutter of claim 1, wherein said shutter blade comprises an angled surface such that the thickness of said blade's leading end is less than the thickness of its trailing end.

28. The optical shutter of claim 27, wherein said angled surface is at 45° with respect to chip normal orientation.

29. The optical shutter of claim 27, wherein said angled surface is reflective such that, when the leading end of said shutter blade covers said pinhole, said angled surface redirects light on said optical path away from said pinhole.

30. The optical shutter of claim 29, further comprising a beam dump positioned to receive light that has been redirected by said shutter blade.

31. The optical shutter of claim 30, wherein said beam dump comprises:
 a wood's horn-shaped cavity; and
 a reflective angled surface arranged to reflect light that has been redirected by said shutter blade into said cavity.

32. The optical shutter of claim 30, wherein said beam dump is micromachined.

33. The optical shutter of claim 1, wherein said shutter blade and actuator are micro-machined.

34. The optical shutter of claim 1, wherein said actuator comprises a micromachined flexure to which said shutter blade is affixed, said actuator arranged such that said flexure deflects and said shutter blade moves laterally towards and covers said pinhole in response to an actuation voltage applied to said actuator.

35. The optical shutter of claim 34, further comprising a micromachined pullin stop which limits the travel of said flexure when said actuator is actuated.

36. The optical shutter of claim 1, wherein said actuator comprises a micromachined flexure to which said shutter blade is affixed, said actuator arranged such that said flexure deflects and said shutter blade moves laterally away from and uncovers said pinhole in response to an actuation voltage applied to said actuator.

37. The optical shutter of claim 36, further comprising a micromachined pullin stop which limits the travel of said flexure when said actuator is actuated.

* * * * *

UNITED STATES PATENT AND TRADEMARK OFFICE
CERTIFICATE OF CORRECTION

| | | |
|---|---|---|
| PATENT NO. | : 10,613,319 B2 | Page 1 of 1 |
| APPLICATION NO. | : 16/005369 | |
| DATED | : April 7, 2020 | |
| INVENTOR(S) | : Mihailovich et al. | |

It is certified that error appears in the above-identified patent and that said Letters Patent is hereby corrected as shown below:

In the Specification

On Column 1, Line 4, before the "BACKGROUND OF THE INVENTION", please insert the following paragraph:
-- STATEMENT REGARDING FEDERALLY SPONSORED RESEARCH OR DEVELOPMENT
This invention was made with Government support under contract W911NF-14-P-0041 awarded by the U.S. Army. The Government has certain rights in the invention. --

Signed and Sealed this
Thirtieth Day of July, 2024

Katherine Kelly Vidal
*Director of the United States Patent and Trademark Office*